UNITED STATES PATENT OFFICE 2,503,198

5-(2'-THIENYL)-2-IMINODIHYDRO-1,3-OXATHIOLES

William S. Emerson and Tracy M. Patrick, Jr., Dayton, Ohio, assignors to Monsanto Chemical Company, St. Louis, Mo., a corporation of Delaware No Drawing. Application July 1, 1947, Serial No. 758,473

4 Claims. (Cl. 260—329)

The present invention relates to a new class of compounds, namely 5-(2'-thienyl)-2-iminodihydro-1,3-oxathioles.

The new compounds of this invention possess the structure

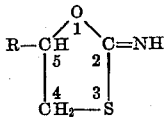

where R is a 2'-thienyl radical, as for example 2'-thienyl or 5'-chloro-2'-thienyl. These compounds may be regarded as derived from either the hydrolysis products of the corresponding dithiocyanates or the addition products of hypothiocyanous acid to the vinyl compounds. However, this invention is not limited to any theory of the mechanism by which the new compounds are formed.

The new compounds may be prepared by treating a vinylthiophene with bromine and a salt of hydrothiocyanic acid in glacial acetic acid followed by treatment with water. Instead of the expected dithiocyanates it was found that iminodihydro-oxathioles were formed. These compounds are useful as insecticides, fungicides and for other purposes.

Treatment of 2-vinylthiophene with bromine and potassium thiocyanate in glacial acetice acid, followed by dilution with water, gave an orange solid. Digestion of this material with boiling ethanol extracted a solid, M. P. 140–141° C. after three crystallizations from ethanol. It is believed to be 5-(2'-thienyl)-2-iminodihydro-1,3-oxathiole.

Anal.—Calculated for $C_7H_7ONS_2$: C, 45.4; H, 3.78; N, 7.57. Found: C, 45.5; H, 4.02; N, 7.85.

Treatment of 5-chloro-2-vinylthiophene with potassium thiocyanate and bromine in glacial acetic acid followed by dilution with water yielded a small amount of the dithiocyanate but the main product was a compound believed to be 5-[2'-(5'-chloro)thienyl]-2-iminodihydro-1,3-oxathiole which melted at 145° C. after two crystallizations from benzene.

Anal.—Calculated for $C_7H_6ONS_2Cl$: C, 38.3; H, 2.76; N, 6.38; S, 29.2. Found: C, 38.2; H, 2.79; N, 6.80; S, 29.7.

This invention is not limited to the specific embodiments of the invention set forth above, these being merely illustrative of one specific means of preparing the new compounds.

The present invention is limited solely by the claims attached hereto as part of the present specification.

What is claimed is:

1. A compound of the structure

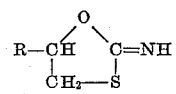

where R is a 2'-thienyl radical selected from the class consisting of 2'-thienyl and 5'-chloro-2'-thienyl.

2. A compound of the structure

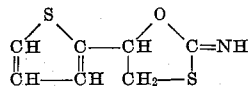

3. A compound of the structure

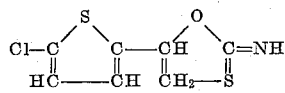

4. The process which comprises reacting a material selected from the group consisting of 2-vinylthiophene and 5-chloro-2-vinylthiophene with bromine and a salt of a thiocyanic acid in a solvent consisting of glacial acetic acid followed by treatment with water and thereupon isolating a 5-(2'-thienyl)-2-iminodihydro-1,3-oxathiole.

WILLIAM S. EMERSON.
TRACY M. PATRICK, Jr.

REFERENCES CITED

The following references are of record in the file of this patent:

UNITED STATES PATENTS

| Number | Name | Date |
|---|---|---|
| 2,276,553 | Werner | Mar. 17, 1942 |
| 2,332,418 | Werner | Oct. 19, 1943 |

OTHER REFERENCES

Chemical Abstracts, 32, 2534 (3) (1938).